(12) United States Patent
Ackelid

(10) Patent No.: US 9,561,542 B2
(45) Date of Patent: Feb. 7, 2017

(54) POWDER PRE-PROCESSING FOR ADDITIVE MANUFACTURING

(71) Applicant: Arcam AB, Moelndal (SE)

(72) Inventor: Ulf Ackelid, Goeteborg (SE)

(73) Assignee: Arcam AB, Moelndal (SE)

( * ) Notice: Subject to any disclaimer, the term of this patent is extended or adjusted under 35 U.S.C. 154(b) by 0 days.

(21) Appl. No.: 14/439,209

(22) PCT Filed: Nov. 6, 2012

(86) PCT No.: PCT/EP2012/071930
§ 371 (c)(1),
(2) Date: Apr. 28, 2015

(87) PCT Pub. No.: WO2014/071968
PCT Pub. Date: May 15, 2014

(65) Prior Publication Data
US 2015/0290710 A1    Oct. 15, 2015

(51) Int. Cl.
*B22F 1/00* (2006.01)
*B22F 3/105* (2006.01)
(Continued)

(52) U.S. Cl.
CPC ........... *B22F 1/0085* (2013.01); *B22F 3/1055* (2013.01); *B28B 1/001* (2013.01); *B28B 17/026* (2013.01);
(Continued)

(58) Field of Classification Search
CPC .............................. B22F 1/1005; B22F 1/0085
See application file for complete search history.

(56) References Cited

U.S. PATENT DOCUMENTS 2,264,968 A    12/1941  De Forest
2,323,715 A    7/1943   Kuehni
(Continued)

FOREIGN PATENT DOCUMENTS

CA    2860188 A1    6/2006
CN    101635210 A   1/2010
(Continued)

OTHER PUBLICATIONS

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.

(Continued)

*Primary Examiner* — Jessee Roe
*Assistant Examiner* — Jeremy Jones
(74) *Attorney, Agent, or Firm* — Alston & Bird LLP

(57) ABSTRACT

The present invention relates to a method for removing moisture from powder to be used in an additive manufacturing process for forming a three-dimensional article through successive fusion of parts of at least one layer of a powder bed provided on a work table, which parts corresponds to successive cross sections of the three-dimensional article, characterized in that said method comprising the steps of: providing at least a first powder tank and at least at least a second powder tank, providing a predetermined amount of powder on a movable table inside said first powder tank, heating the top surface of the powder in said first powder tank to a predetermined temperature interval for removing moisture from said powder, raising said movable table a predetermined distance, moving a predetermined thickness of the powder material from said first powder tank to said second powder tank.

11 Claims, 4 Drawing Sheets

(51) Int. Cl.
*B29C 67/00* (2006.01)
*B28B 1/00* (2006.01)
*B28B 17/02* (2006.01)
*B29B 13/06* (2006.01)
*B22F 7/00* (2006.01)
*B33Y 10/00* (2015.01)
*B33Y 40/00* (2015.01)
*B29K 105/00* (2006.01)

(52) U.S. Cl.
CPC ......... *B29B 13/065* (2013.01); *B29C 67/0077* (2013.01); *B29C 67/0085* (2013.01); *B22F 2003/1056* (2013.01); *B29K 2105/251* (2013.01); *B33Y 10/00* (2014.12); *B33Y 40/00* (2014.12); *Y02P 10/295* (2015.11)

(56) References Cited

U.S. PATENT DOCUMENTS

| | | |
|---|---|---|
| 3,882,477 A | 5/1975 | Mueller |
| 4,348,576 A | 9/1982 | Anderl et al. |
| 4,401,719 A | 8/1983 | Kobayashi et al. |
| 4,818,562 A | 4/1989 | Arcella et al. |
| 4,863,538 A | 9/1989 | Deckard |
| 4,927,992 A | 5/1990 | Whitlow et al. |
| 4,988,844 A | 1/1991 | Dietrich et al. |
| 5,167,989 A | 12/1992 | Dudek et al. |
| 5,182,170 A | 1/1993 | Marcus et al. |
| 5,204,055 A | 4/1993 | Sachs et al. |
| 5,247,560 A | 9/1993 | Hosokawa et al. |
| 5,483,036 A | 1/1996 | Giedt et al. |
| 5,511,103 A | 4/1996 | Hasegawa |
| 5,647,931 A | 7/1997 | Retallick et al. |
| 5,753,274 A | 5/1998 | Wilkening et al. |
| 5,837,960 A | 11/1998 | Lewis et al. |
| 5,876,550 A | 3/1999 | Feygin et al. |
| 5,904,890 A | 5/1999 | Lohner et al. |
| 5,932,290 A | 8/1999 | Lombardi et al. |
| 6,046,426 A | 4/2000 | Jeantette et al. |
| 6,162,378 A | 12/2000 | Bedal et al. |
| 6,419,203 B1 | 7/2002 | Dang |
| 6,554,600 B1 | 4/2003 | Hofmann et al. |
| 6,583,379 B1 | 6/2003 | Meiners et al. |
| 6,746,506 B2 | 6/2004 | Liu et al. |
| 6,751,516 B1 | 6/2004 | Richardson |
| 6,764,636 B1 | 7/2004 | Allanic et al. |
| 6,811,744 B2 | 11/2004 | Keicher et al. |
| 6,815,636 B2 | 11/2004 | Chung et al. |
| 6,824,714 B1 | 11/2004 | Türck et al. |
| 7,003,864 B2 | 2/2006 | Dirscherl |
| 7,020,539 B1 | 3/2006 | Kovacevic et al. |
| 7,165,498 B2 | 1/2007 | Mackrill et al. |
| 7,204,684 B2 | 4/2007 | Ederer et al. |
| 7,291,002 B2 | 11/2007 | Russell et al. |
| 7,540,738 B2 | 6/2009 | Larsson et al. |
| 7,635,825 B2 | 12/2009 | Larsson |
| 7,686,605 B2 | 3/2010 | Perret et al. |
| 7,696,501 B2 | 4/2010 | Jones |
| 7,713,454 B2 | 5/2010 | Larsson |
| 7,754,135 B2 | 7/2010 | Abe et al. |
| 7,799,253 B2 | 9/2010 | Höchsmann et al. |
| 7,871,551 B2 | 1/2011 | Wallgren et al. |
| 8,021,138 B2 | 9/2011 | Green |
| 8,083,513 B2 | 12/2011 | Montero-Escuder et al. |
| 8,187,521 B2 * | 5/2012 | Larsson ............... B22F 3/1055 264/485 |
| 8,308,466 B2 | 11/2012 | Ackelid et al. |
| 8,992,816 B2 | 3/2015 | Jonasson et al. |
| 9,073,265 B2 | 7/2015 | Snis |
| 9,079,248 B2 | 7/2015 | Ackelid |
| 9,126,167 B2 | 9/2015 | Ljungblad |
| 9,310,188 B2 | 4/2016 | Snis |
| 2002/0104973 A1 | 8/2002 | Kerekes |
| 2002/0152002 A1 | 10/2002 | Lindemann et al. |
| 2003/0133822 A1 | 7/2003 | Harryson |
| 2004/0084814 A1 | 5/2004 | Boyd et al. |
| 2004/0104499 A1 | 6/2004 | Keller |
| 2004/0173496 A1 | 9/2004 | Srinivasan |
| 2004/0173946 A1 | 9/2004 | Pfeifer et al. |
| 2005/0186538 A1 | 8/2005 | Uckelmann |
| 2006/0108712 A1 | 5/2006 | Mattes |
| 2006/0145381 A1 | 7/2006 | Larsson |
| 2006/0147332 A1 | 7/2006 | Jones et al. |
| 2006/0157892 A1 | 7/2006 | Larsson |
| 2006/0180957 A1 | 8/2006 | Hopkinson et al. |
| 2006/0284088 A1 | 12/2006 | Fukunaga et al. |
| 2007/0175875 A1 | 8/2007 | Uckelmann et al. |
| 2007/0182289 A1 | 8/2007 | Kigawa et al. |
| 2007/0298182 A1 | 12/2007 | Perret et al. |
| 2008/0236738 A1 | 10/2008 | Lo et al. |
| 2009/0017219 A1 | 1/2009 | Paasche et al. |
| 2009/0152771 A1 | 6/2009 | Philippi et al. |
| 2010/0310404 A1 | 12/2010 | Ackelid |
| 2011/0133367 A1 | 6/2011 | Weidinger et al. |
| 2011/0293770 A1 | 12/2011 | Ackelid et al. |
| 2011/0309554 A1 | 12/2011 | Liska et al. |
| 2011/0316178 A1 | 12/2011 | Uckelmann |
| 2012/0100031 A1 | 4/2012 | Ljungblad |
| 2012/0164322 A1 | 6/2012 | Teulet et al. |
| 2012/0193530 A1 | 8/2012 | Parker et al. |
| 2012/0223059 A1 | 9/2012 | Ackelid |
| 2012/0225210 A1 | 9/2012 | Fruth |
| 2012/0266815 A1 | 10/2012 | Brunermer |
| 2013/0300286 A1 | 11/2013 | Ljungblad et al. |
| 2014/0301884 A1 | 10/2014 | Hellestam et al. |
| 2014/0308153 A1 | 10/2014 | Ljungblad |
| 2014/0314609 A1 | 10/2014 | Ljungblad et al. |
| 2014/0314964 A1 | 10/2014 | Ackelid |
| 2014/0348691 A1 | 11/2014 | Ljungblad et al. |
| 2014/0363327 A1 | 12/2014 | Holcomb |
| 2014/0367367 A1 | 12/2014 | Wood et al. |
| 2015/0004045 A1 | 1/2015 | Ljungblad |
| 2015/0071809 A1 | 3/2015 | Nordkvist et al. |
| 2015/0086409 A1 | 3/2015 | Hellestam |
| 2015/0088295 A1 | 3/2015 | Hellestam |
| 2015/0139849 A1 | 5/2015 | Pialot, Jr. et al. |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 | 6/2015 | Elfstroem et al. |
| 2015/0251249 A1 | 9/2015 | Fager |
| 2015/0283610 A1 | 10/2015 | Ljungblad et al. |
| 2015/0283613 A1 | 10/2015 | Backlund et al. |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2016/0311021 A1 | 10/2016 | Elfstroem et al. |

FOREIGN PATENT DOCUMENTS

| | | | |
|---|---|---|---|
| CN | 201693176 U | 1/2011 | |
| DE | 19952998 A1 * | 5/2001 | ............ B29C 41/12 |
| DE | 20305843 U1 | 7/2003 | |
| DE | 102005014483 A1 | 10/2006 | |
| DE | 202008005417 U1 | 8/2008 | |
| DE | 102007018601 A1 | 10/2008 | |
| DE | 102007029052 A1 | 1/2009 | |
| DE | 102008012064 A1 | 9/2009 | |
| EP | 0289116 A1 | 11/1988 | |
| EP | 0322257 A2 | 6/1989 | |
| EP | 0688262 A1 | 12/1995 | |
| EP | 1418013 A1 | 5/2004 | |
| EP | 1466718 A2 | 10/2004 | |
| EP | 1683593 A2 | 7/2006 | |

(56) References Cited

FOREIGN PATENT DOCUMENTS

| | | |
|---|---|---|
| EP | 1721725 A1 | 11/2006 |
| EP | 1952932 A2 | 8/2008 |
| EP | 2011631 A1 | 1/2009 |
| EP | 2119530 A1 | 11/2009 |
| EP | 2281677 A1 | 2/2011 |
| JP | 2003245981 | 9/2003 |
| SE | 524467 C2 | 8/2004 |
| WO | WO 93/08928 A1 | 5/1993 |
| WO | WO 96/12607 A1 | 5/1996 |
| WO | WO 97/37523 A2 | 10/1997 |
| WO | WO 01/81031 A1 | 11/2001 |
| WO | WO 01/85386 A2 | 11/2001 |
| WO | WO 02/08653 A1 | 1/2002 |
| WO | WO 2004/007124 A1 | 1/2004 |
| WO | WO 2004/043680 A2 | 5/2004 |
| WO | WO 2004/054743 A1 | 7/2004 |
| WO | WO 2004/056511 A1 | 7/2004 |
| WO | WO 2006/091097 A2 | 8/2006 |
| WO | WO 2006/121374 A1 | 11/2006 |
| WO | WO 2007/112808 A1 | 10/2007 |
| WO | WO 2007/147221 A1 | 12/2007 |
| WO | WO 2008/013483 A1 | 1/2008 |
| WO | WO 2008/057844 A1 | 5/2008 |
| WO | WO 2008/125497 A1 | 10/2008 |
| WO | WO 2008/147306 A1 | 12/2008 |
| WO | WO 2009/000360 A1 | 12/2008 |
| WO | WO 2009/072935 A1 | 6/2009 |
| WO | WO 2009/084991 A1 | 7/2009 |
| WO | WO 2010/095987 A1 | 8/2010 |
| WO | WO 2011/008143 A1 | 1/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/098050 A1 | 7/2013 |
| WO | WO 2013/098135 A1 | 7/2013 |
| WO | WO 2013/159811 A1 | 10/2013 |
| WO | WO 2013/167194 A1 | 11/2013 |
| WO | WO 2013/178825 A2 | 12/2013 |
| WO | WO 2014/095200 A1 | 6/2014 |
| WO | WO 2014/095208 A1 | 6/2014 |

OTHER PUBLICATIONS

European Search Report dated Feb. 16, 2012, for corresponding Application No. EP07852089.7.
Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.
International Preliminary Examining Authority (IPEA), Second Written Opinion for International Application No. PCT/EP2012/076025, mailed Dec. 4, 2013, 4 pages European Patent Office, Germany.
International Preliminary Examining Authority, International Preliminary Report on Patentability for International Application No. PCT/EP2012/076025, including Applicant's Sep. 10, 2013 Response to the ISA's May 17, 2013 Written Opinion and Applicant's Jan. 14, 2014 Response to the IPEA's Second Written Opinion, mailed Apr. 4, 2014, 15 pages, European Patent Office, Germany.
International Preliminary Examining Authority, International Preliminary Report on Patentability for International Application No. PCT/EP2012/074383, including Applicant's Sep. 6, 2013 Reply to ISA's Feb. 27, 2013 Written Opinion, mailed Jan. 20, 2014, 16 pages, European Patent Office, The Netherlands.
International Preliminary Report on Patentability, dated Nov. 27, 2009, of corresponding international application No. PCT/SE2007/001084.
International Search Report dated Apr. 9, 2010 for Application No. PCT/SE2009/050901.
International Search Report dated Sep. 17, 2008 for Application No. PCT/SE2008/000007.
International Search Report mailed Sep. 2, 2008 of corresponding international application No. PCT/SE2007/001084.
International Searching Authority (ISA), International Search Report and Written Opinion for International Application No. PCT/EP2012/076025, mailed May 17, 2013, 11 pages, European Patent Office, The Netherlands.
International Searching Authority, International Search Report and Written Opinion for International Application No. PCT/EP2012/074383, mailed Feb. 27, 2013, 10 pages, European Patent Office, The Netherlands.
International Searching Authority, International Search Report for International Application No. PCT/SE2011/050093, mailed Oct. 20, 2011, 5 pages, The Swedish Patent and Registration Office, Sweden.
Weigel, TH., et al., "Design and Preparation of Polymeric Scaffolds for Tissue Engineering," Expert Rev. Med. Devices, 2006, pp. 835-851, vol. 3, No. 6, XP002691485.
Yang, et al., "The Design of Scaffolds for Use in Tissue Engineering, Part II, Rapid Prototyping Techniques", Tissue Engineering, 2002, pp. 1-11, vol. 8, No. 1, XP002691484.
International Searching Authority, International Search Report for International Application No. PCT/EP2012/057470, mailed Jan. 24, 2013, 1 page, European Patent Office, The Netherlands.
International Searching Authority, International Search Report for International Application No. PCT/EP2012/058733, Mar. 5, 2013, 4 pages, European Patent Office, The Netherlands.
International Searching Authority, International Search Report and Written Opinion for International Application No. PCT/EP2012/071930, Aug. 5, 2013, 8 pages, European Patent Office.
International Preliminary Examining Authority, International Preliminary Report on Patentability, including Applicant's submittal of Jan. 15, 2015 amended claims, for International Application PCT/EP2012/071930, Feb. 6, 2015, 10 pages, European Patent Office.

* cited by examiner

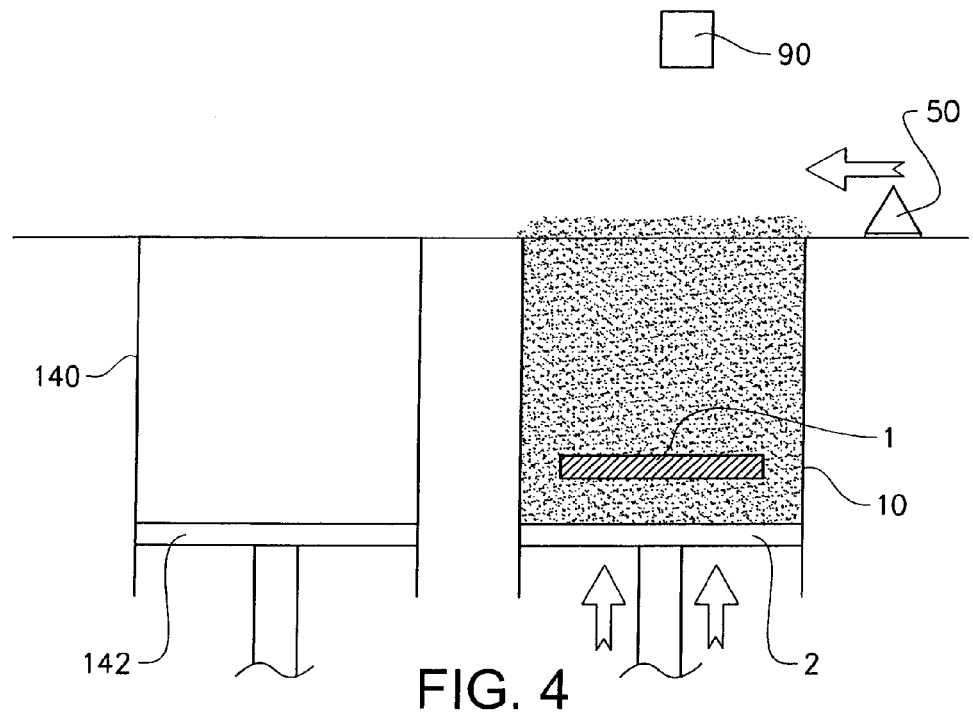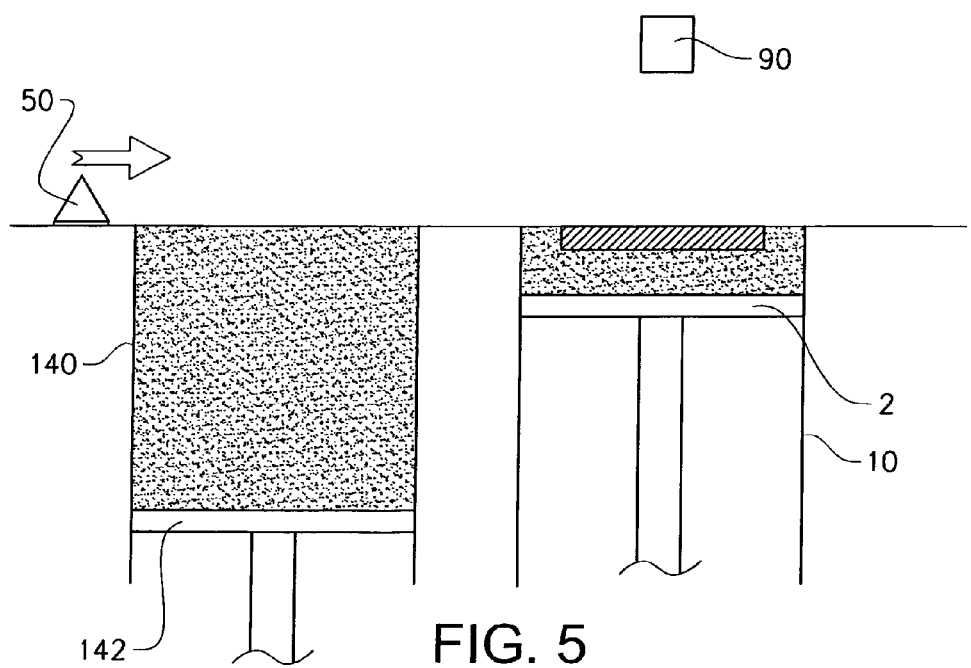

POWDER PRE-PROCESSING FOR ADDITIVE MANUFACTURING

CROSS REFERENCE TO RELATED APPLICATIONS

This application is a National Stage Application, filed under 35 U.S.C. §371, of International Application No. PCT/EP2012/071930, filed Nov. 6, 2012, the contents of which are hereby incorporated by reference in their entirety.

BACKGROUND

Related Field

The present invention relates to a powder pre processing method for additive manufacturing according to the preamble of claim 1.

Description of Related Art

Freeform fabrication or additive manufacturing is a method for forming three-dimensional articles through successive fusion of chosen parts of powder layers applied to a worktable.

An additive manufacturing apparatus may comprise a work table on which said three-dimensional article is to be formed, a powder dispenser, arranged to lay down a thin layer of powder on the work table for the formation of a powder bed, an energy beam for delivering energy to the powder whereby fusion of the powder takes place, elements for control of the energy given off by the energy beam over said powder bed for the formation of a cross section of said three-dimensional article through fusion of parts of said powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

In additive manufacturing it is important to control the powder distribution. It is desirably to distribute a predefined amount of powder over a predetermined area. This requires a well defined method and apparatus for repeatedly removing a predetermined amount of powder from a powder storage to a powder distributor device. One problem that may arise is that the powder may have more or less of built in moisture. Said moisture may affect the flowability of the powder which in turn may affect the smoothness and thickness of the applied powder layer on the work table. Moisture in powder material for additive manufacturing may also affect the material properties of the final 3-dimensional product in an undesirable way.

BRIEF SUMMARY

An object of the invention is to provide a method which removes the moisture from the powder before starting the additive manufacturing process.

The abovementioned object is achieved by the features in the method according to claim 1.

In a first aspect of the invention it is provided a method for removing moisture from powder to be used in an additive manufacturing process for forming a three-dimensional article through successive fusion of parts of at least one layer of a powder bed provided on a work table, which parts corresponds to successive cross sections of the three-dimensional article. Said method comprising the steps of:
 a. providing at least a first powder tank and at least at least a second powder tank,
 b. providing a predetermined amount of powder on a movable table inside said first powder tank,
 c. heating the top surface of the powder in said first powder tank to a predetermined temperature for removing moisture from said powder,
 d. raising said movable table a predetermined distance,
 e. moving a predetermined thickness of the powder material from said first powder tank to said second powder tank.

An advantage of the present invention is that the moisture may be removed before using the powder in an additive manufacturing process eliminating that the moisture in said powder may affect the material properties of the three-dimensional article. Another advantage is that the removal of moisture may take place during pumping vacuum which means that the total manufacturing time may not be extended.

In an example embodiment of the present invention steps c-e may be repeated until a predetermined amount of powder is moved from the first powder tank to said second powder tank.

An advantage of this embodiment is that not more than a predetermined amount of powder than necessary for building a predetermined three-dimensional article is dried, although the first powder tank may comprise more than said predetermined amount of powder.

In another example embodiment said method further comprising the step of providing said first and second powder tank inside an enclosable chamber, which may be a vacuum chamber.

An advantage of this embodiment is that not only the moisture may be removed from the powder material which may affect the final material properties of the three-dimensional article but also the environment may be controlled so that the whole ambient atmosphere around the build and powder tank is set to affect the final properties in a controlled manner.

In one example embodiment a heating of the top surface of the powder in said second powder tank is performed instead of the top surface of the powder in said first powder tank.

An advantage of this embodiment is that the powder may be dried fasted compared to if a top surface of a full powder tank is heated. This is because moisture from powder in the full or partially full powder tank may contaminate the dried powder. In the case of drying a small amount of powder in said second powder container no contamination is performed as soon as the powder is dried.

In one example embodiment of the present invention said temperature is less than a reaction temperature in which the moisture is starting to react chemically with the powder material.

An advantage of said embodiment is that the heating power may be set differently for different materials depending on the tendency to react with the moisture.

In still another example embodiment said temperature is less than a sintering temperature in which powder particles in said powder is starting to sinter together.

When there is no tendency of reaction of the powder material with the moisture the temperature may be increased to a predetermined temperature below the sintering temperature which may further decrease the powder moisture removal time.

In another example embodiment of the present invention said method further comprising the steps of:
 g. raising a movable table inside said second powder tank a predetermined distance, h. moving a predetermined amount of powder from said second powder tank to a third powder tank,
i. distributing said powder on top of a work table inside said third powder tank,
j. forming a first layer of said three-dimensional article by fusing said layer of powder provided on said work table in predetermined locations,
k, lowering the work table in said third powder tank a predetermined distance,
l, repeating steps g-k until the three-dimensional article is finalized.

After having finalized the removal of moisture of a predetermined amount of powder the 3-dimensional article may start to be produced with the powder which does not contain moisture.

In still another example embodiment of the present invention said method further comprising the step of providing a supplementary heating device for heating the top surface of the powder material.

An advantage with said embodiment is the said additional heating device may work alone or in combination with the device for sintering/melting the powder to form the 3-dimensional article. This may further decrease the time for removal of the moisture from the powder material.

In yet another example embodiment of the present invention the fusing of the powder material and heating of the top surface of the powder material for removing moisture is performed by the same high energy beam source.

An advantage of this embodiment is that the energy source may be set in a mode in which the power is distributed into a larger area compared to when said energy source is used for sintering/fusing. By increasing the area of the energy spot on the powder surface may make it possible to further increase to total power of the energy beam and thereby decreasing the time for removal of the moisture from the powder material.

In still another example embodiment of the present invention said method further comprising the step of performing at least a part of said heating step for removing the moisture from the powder while said three-dimensional article is manufactured.

An advantage of this embodiment is that the total manufacturing tame of the three-dimensional time maybe reduced.

In still another example embodiment of the present invention said method further comprising the step of providing a supplementary heating device for heating the top surface of the powder material from above.

An advantage of this embodiment is that the manufacturing time of the three dimensional article may still further be reduced since the heating of the powder is separated and independent from the fusing of powder for producing the three-dimensional article in another powder tank.

In still another example embodiment of the present invention said method further comprising the step of providing a supplementary heating device below said movable table in said second powder tank for heating the powder material.

An advantage of this embodiment is that the heating from below may assist the heating of the top surface and thereby decreasing the time needed for reaching a predetermined temperature.

In still another example embodiment said method further comprising the step of starting said heating of said top surface of said powder material as soon as under pressure in said vacuum chamber is established.

An advantage of this embodiment is that as soon as the vacuum pumps have started moisture generated from the heating of the top surface layer of the powder bed may be removed from the vacuum chamber. In an alternative embodiment said moisture may be transported away from an enclosed chamber by a flow of a suitable gas, such as Argon, Helium or Nitrogen.

BRIEF DESCRIPTION OF THE FIGURES

The invention will be further described in the following, in a non-limiting way with reference to the accompanying drawings. Same characters of reference are employed to indicate corresponding similar parts throughout the several figures of the drawings:

FIG. 4-5 depict, in a schematic view, a second embodiment of a device according to the present invention for removing moisture inside an apparatus for producing a three dimensional product.

DETAILED DESCRIPTION OF VARIOUS EMBODIMENTS

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g. of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of charged particle beam can include an electron gun, a linear accelerator and so on.

Figure 1:
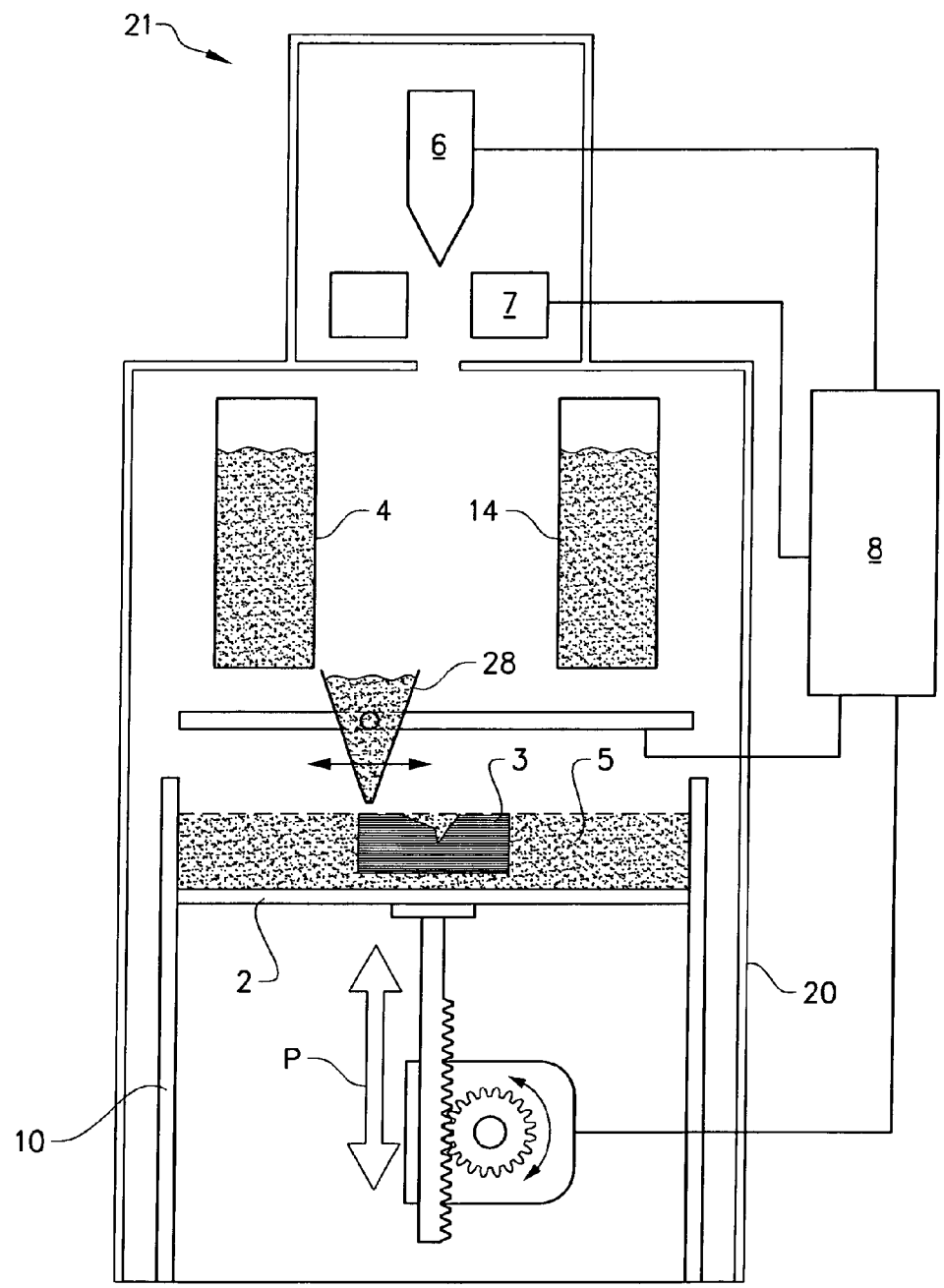
FIG. 1, shows, in a schematic view, an apparatus for producing a three dimensional product according to prior art.

FIG. 1 depicts an embodiment of a freeform fabrication or additive manufacturing apparatus 21 according to prior art.

Said apparatus 21 comprising an electron beam gun 6; deflection coils 7; two powder hoppers 4, 14; a build platform 2; a build tank 10; a powder distributor 28; a powder bed 5; and a vacuum chamber 20.

The vacuum chamber 20 is capable of maintaining a vacuum environment by means of a vacuum system, which system may comprise a turbomolecular pump, a scroll pump, an ion pump and one or more valves which are well known to a skilled person in the art and therefore need no further explanation in this context. The vacuum system is controlled by a control unit 8.

The electron beam gun 6 is generating an electron beam which is used for melting or fusing together powder material provided on the build platform 2. At least a portion of the electron beam gun 6 may be provided in the vacuum chamber 20. The control unit 8 may be used for controlling and managing the electron beam emitted from the electron beam gun 6. At least one focusing coil (not shown), at least one deflection coil 7, an optional coil for astigmatic correction (not shown) and an electron beam power supply (not shown) may be electrically connected to said control unit 8. In an example embodiment of the invention said electron beam gun 6 generates a focusable electron beam with an accelerating voltage of about 15-60 kV and with a beam power in the range of 3-10 Kw. The pressure in the vacuum chamber may be $10^{-3}$ mbar or lower when building the three-dimensional article by fusing the powder layer by layer with the energy beam.

In an alternative embodiment a laser beam may be used for melting or fusing the powder material. In such case tiltable mirrors may be used in the beam path in order to deflect the laser beam to a predetermined position.

The powder hoppers 4, 14 comprise the powder material to be provided on the build platform 2 in the build tank 10. The powder material may for instance be pure metals or metal alloys such as titanium, titanium alloys, aluminum, aluminum alloys, stainless steel, Co—Cr alloys, nickel based superalloys etc.

The powder distributor 28 is arranged to lay down a thin layer of the powder material on the build platform 2. During a work cycle the build platform 2 will be lowered successively in relation to a fixed point in the vacuum chamber. In order to make this movement possible, the build platform 2 is in one embodiment of the invention arranged movably in vertical direction, i.e., in the direction indicated by arrow P. This means that the build platform 2 starts in an initial position, in which a first powder material layer of necessary thickness has been laid down. Means for lowering the build platform 2 may for instance be through a servo engine equipped with a gear, adjusting screws etc.

An electron beam may be directed over said build platform causing said first powder layer to fuse in selected locations to form a first cross section of said three-dimensional article. The beam is directed over said build platform 2 from instructions given by the control unit 8. In the control unit 8 instructions for how to control the electron beam for each layer of the three-dimensional article is stored.

After a first layer is finished, i.e., the fusion of powder material for making a first layer of the three-dimensional article, a second powder layer is provided on said build platform 2. The second powder layer is preferably distributed according to the same manner as the previous layer. However, there might be alternative methods in the same additive manufacturing machine for distributing powder onto the work table.

After having distributed the second powder layer on the build platform, the energy beam is directed over said work table causing said second powder layer to fuse in selected locations to form a second cross section of said three-dimensional article. Fused portions in the second layer may be bonded to fused portions of said first layer. The fused portions in the first and second layer may be melted together by melting not only the powder in the uppermost layer but also remelting at least a fraction of a thickness of a layer directly below said uppermost layer.

Figure 2:
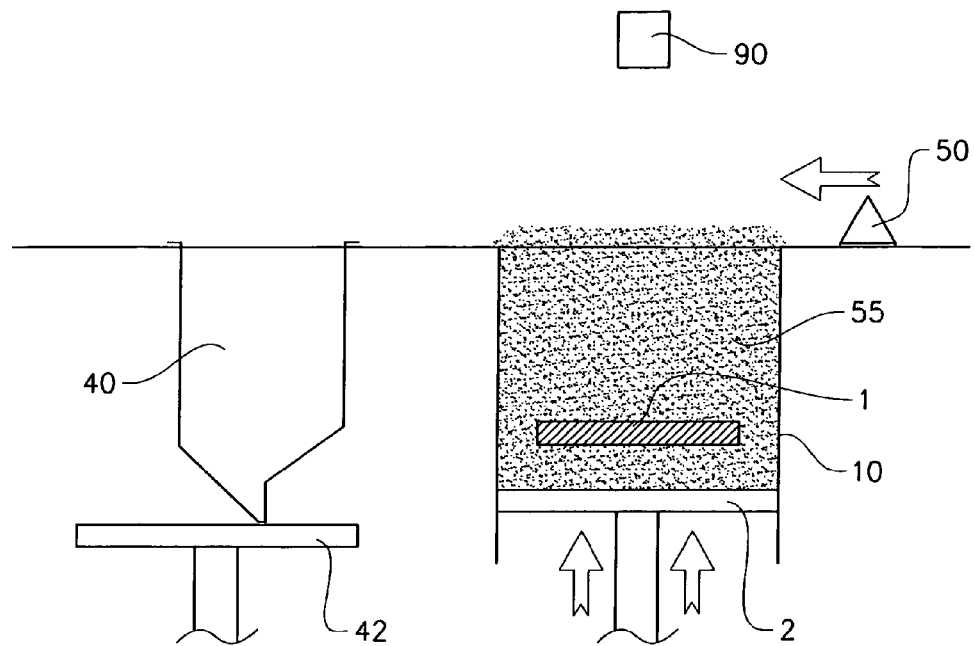
FIG. 2-3, depict, in a schematic view, a first embodiment of a device according to the present invention for removing moisture inside an apparatus for producing a three dimensional product.
Figure 3:
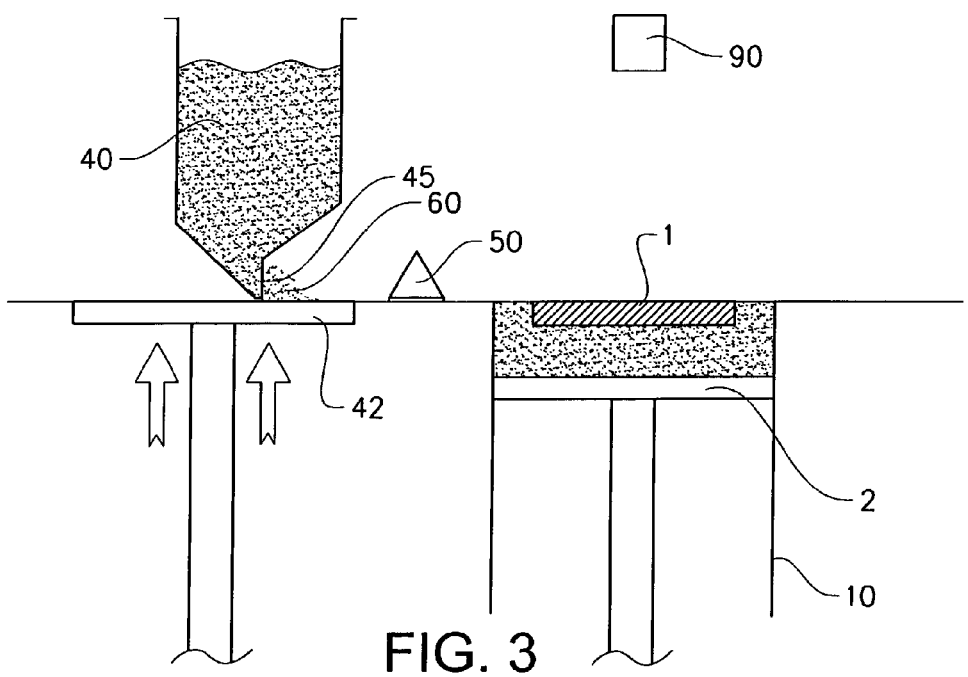

FIGS. 2 and 3 depicts schematically a first example embodiment of an inventive setup for removing moisture from the powder inside the vacuum chamber. The powder hoppers 4, 14 and the powder distributor 28 in FIG. 1 have been exchanged with a movable powder hopper 40 and a powder rake 50. To start with a predetermined amount of powder 55 is provided on said worktable 1 inside said build tank 10. Between said worktable 1 and said build platform 2, which is movable, there is provided a predetermined amount of powder forming a powder layer between said build platform 2 and said work table 1. In an alternative embodiment said build platform 2 may be removable and in such embodiment said work table 1 may be unnecessary. The top surface of the powder in said build tank may be heated by a heating device 90 in order to reach a predetermined temperature interval which is high enough for removing moisture but less than a reaction temperature in which the moisture is starting to react with the powder material. Depending on the power and time said heating is taking place, moisture may be removed from different thicknesses, i.e., the longer the time and the higher the power the thicker the layer of powder may be in which the moisture is removed. Moisture is removed as water vapor from the vacuum chamber via the vacuum pumps or via the gas flow.

The heating device may be a supplementary heater for instance a microwave device, IR device, laser device. In another example embodiment the heating device for heating the top surface of the powder in order to remove moisture is the same device as used later on to fuse the powder material in selected location in order to build the three dimensional article in a layer by layer fashion. In the case the device is the same for heating in order to remove moisture and sintering/fusing in order to build the three dimensional article the device may be at least one laser source or at least one electron beam source.

Different materials react more or less easily with the moisture which is generated during the heating. It is therefore necessary to control and set the power and time for different powder materials individually. There is typically a temperature interval in which moisture is generated which can be pumped away from the vacuum chamber without affecting the material properties of the powder material. For Titanium such temperature interval is between room temperature-about +400° C. at the very top surface. At room temperature very small amount of moisture is generated and therefore most of the moisture will remain in the powder if not waiting a very long time. Above approximately +400° C. the moisture may start to react with the titanium powder material and changing the material properties in an undesirable way. In a first embodiment the temperature interval for removing moisture in titanium powder may be between +100° C.-+350° C. In another embodiment the temperature interval for removing moisture in titanium powder may be between +200° C.-+300° C.

Other powder materials may not react at all with the moisture which is generated during the heating process and therefore the temperature can be raised further. In such cases the temperature interval may be from room temperature-predetermined temperature below sintering temperature. In order to make sure that the powder stays in powder form and not sinter into bigger agglomerates a safety interval may be set, which may for instance be 10-100 degrees below the sintering temperature of the particular powder material which is not sensitive for reacting with the moisture. As with Titanium, at room temperature very little moisture is removed per time interval so the temperature interval may typically be between +100° C. or more—predetermined temperature below sintering temperature.

When the heating of the top surface is finalized said build platform 2 and the work table 1 may be raised a predetermined distance. Said distance may for instance be between 0.1-1 mm. The powder rake 50 removes a predetermined thickness of the powder material from said build tank 10 to said powder hopper 40. In an example embodiment said rake removes the same thickness as the distance in which the build platform is raised. In an alternative embodiment a fraction of the height in which the build platform 2 is raised is removed and transferred from the build tank 10 to the powder hopper 40.

After the first layer of powder which is free from moisture has been removed from the build tank 10 to the powder hopper 40 the heating of the new top surface of the powder in said build container may take place. When said new layer is dried from moisture a predetermined amount of powder is removed from the build tank 10 to said powder hopper 40 by increasing the height of the build platform and thereafter using the powder rake 50 for raking over powder form the build tank 10 to the powder hopper 40. This heating and transferring of dried powder from the build tank 10 to the powder hopper 40 is continued until the build tank is free from powder on top of the work table 1. In another example embodiment said heating and transferring of dried powder form the build tank 10 to the powder hopper 40 is continued until a predetermined amount of powder is transferred from the build tank 10 to the powder hopper 40.

In FIG. 3 the powder hopper 40 has been raised in comparison with FIG. 2. In FIG. 2 a top of the build tank 10 and a top of the powder hopper 40 are about the same level. In another embodiment said top of the powder hopper 40 may be lower in comparison with the top of the build tank. In such an embodiment it is still possible to rake powder material from the build tank 10 to the powder hopper. However, in FIG. 3, a powder plate 42 which is arranged on the bottom level of the powder hopper is arranged to be about the same level as the top of the build tank 10. By providing the powder plate 42 at the same level as the top of the build tank makes it possible to rake powder material 55 from the powder hopper 40 provided on said powder plate 42 from said powder plate 42 to said build tank 10 with said powder rake 50. In another example embodiment said powder plate may be arranged at a higher level than the top of the build tank. In such an embodiment it is still possible to rake over material from the powder plate to the build tank. Of course there is no or very small gap between the powder plate 42 and the top of the powder hopper and the build tank in order to let most of the powder being raked from one position to the other and not to fall at undesirable locations. The powder hopper comprises an opening 45 at the bottom which allows for a predetermined amount of powder to fall out of the powder hopper 40. The powder rake may be catching powder material from said fallen out powder from said powder hopper 40 by simply moving into said fallen out powder material. The amount of powder which may be caught by said powder rake may be dependent on the distance said powder rake is moved into the fallen out powder material, the further into the material said powder rake is moved the more material is brought out by it until a predetermined limit which is defined by the size and shape of the powder rake 50.

The principle of removing powder form the fallen out powder material in FIG. 2 and FIG. 3 may work as follows. If a front side of the powder rake is defined to be the side which is first moved in to the fallen out powder material, powder falling on the other side, back side, of the powder rake is the powder material which is to be raked (transferred) from one position to another when the rake is changing direction. The backside of the powder rake is then pushing the material in front of the powder rake and transferring said powder material for from the powder plate 42 to the build tank 10.

The powder which is raked from the powder hopper to the build tank is distributed evenly on top of said work table inside said build tank. Said evenly distribution may be performed with the powder rake 50, but may also be performed with another distribution device such as another rake or a vibration or oscillation mechanism.

A first layer of said three-dimensional article may be formed by fusing said layer of powder provided on said work table in predetermined locations.

The work table may be lowered a predetermined distance in order to allow a further layer of powder material to be provided on the already applied powder layers on said work table. The steps of raking new powder material from the powder hopper to the build tank, distribution of said powder on said work table, fusing of said powder layers on predetermined location and lowering of said work table is repeated until the three dimensional article is finalized.

In an alternative embodiment as depicted in FIG. 4 and FIG. 5 the powder hopper 40 in FIGS. 2 and 3 has been exchanged with an alternative design. The powder hopper 140 in FIGS. 4 and 5 is very similar to the build tank 10. The powder hopper 140 comprises a movable bottom plate 142, which may change its position in the same way as the build platform 2 in the build tank 10. One example embodiment of how said bottom plate may be moved is illustrated in FIG. 1.

Instead of as in FIG. 2 and FIG. 3, where the powder rake is moved into a pile of powder material in order to catch a predetermined amount of powder, the powder rake in FIG. 4 and FIG. 5 is raking powder material from the powder hopper to the build tank and from the build tank to the powder hopper in the same way. If powder material is going to be moved from the build tank 10 to the powder hopper 140 when the powder is dried layer by layer as disclosed above, the build platform is raised a predetermined distance allowing a predetermined amount of powder to be raked from the build tank to the powder hopper 140. In a similar way, when powder material is going to be moved from the powder hopper 140 to the build tank 10, the bottom plate 142 of the powder hopper 140 is raised a predetermined distance allowing a predetermined amount of powder to be raked from the powder hopper 140 to the build tank 10.

In FIGS. 2 and 3 it is only illustrated one powder hopper to the left of the build tank. In an alternative embodiment there may be provided another powder hopper to the right of the build tank 10. In FIG. 4 and FIG. 5 it is also only illustrated one powder hopper to the left of the build tank. In an alternative embodiment there may be provided another powder hopper to the right of the build tank 10.

Figure 6:
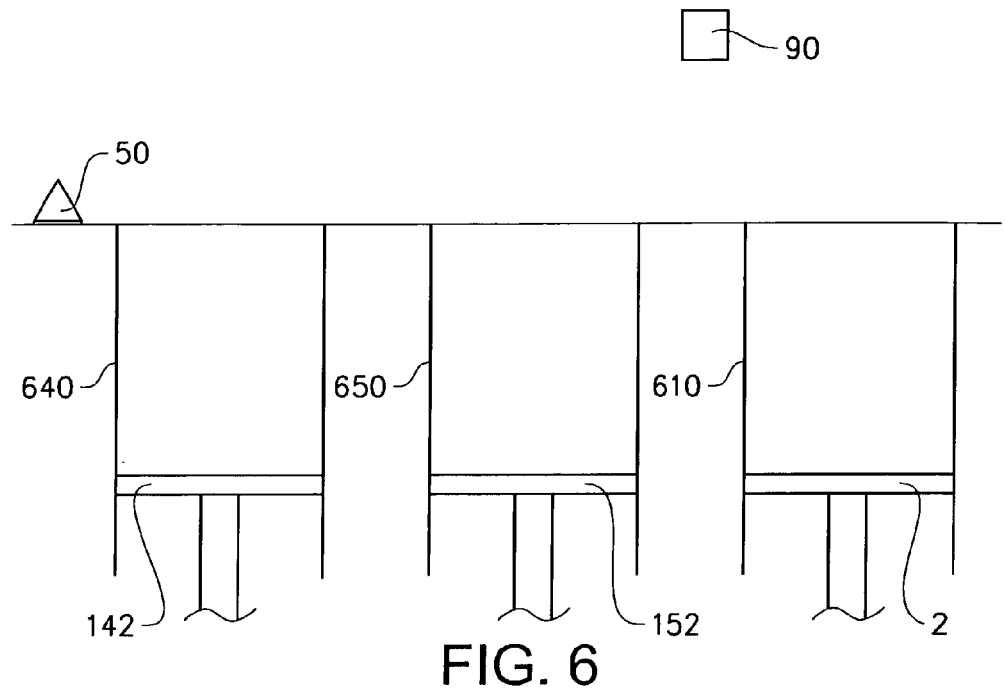
FIG. 6 depicts, in a schematic view, a third embodiment of a device according to the present invention for removing moisture inside an apparatus for producing a three dimensional product.

In FIG. 6 still another example embodiment of the present invention is depicted. In FIG. 6 a first powder container 640, a second powder container 650 and a third powder container 610 are arranged beside each other. The second powder container 640 is arranged between the first and second powder container. Each of said powder container may comprise a movable bottom plate or table 142, 152, 2 which may change its position in the same way as the build platform 2 in the build tank 10. One example embodiment of how said bottom plate may be moved is illustrated in FIG. 1.

A powder rake 50 may be raking powder material from one powder container 640, 650 or 610 to any of the other powder container 640, 650 or 610. A method of drying powder using three powder containers as depicted in FIG. 6 may be performed as follows.

Powder which may comprise moisture is arranged in the first powder container 640. A heating device 90 may be heating the top surface of the powder in said first powder container to a predetermined temperature for allowing moisture to leave the powder. Said movable table 142 is thereafter raised a predetermined amount. The rake is moving a predetermined thickness of the powder from said first powder container to said second powder container. This may continue until a predetermined amount of powder has been moved from said first powder container to said second powder container. A three dimensional article may thereafter be built in said third powder container 610 in a layer by layer fashion by taking predetermined amount of dried powder from said second powder container 650.

In an alternative embodiment said three-dimensional article is built in said third powder container while powder is dried in said second powder container. Here a first heating source 90 may be used for the drying process in said second powder container 650 and a second heating source (not shown) may be used for the heating and fusion process for manufacturing said three-dimensional article in said third powder container. Alternatively, the same heat source is used for heating the powder in said second and third powder container, i.e., the heating source is moved (deflected) back and forth between said second and third powder container.

In still another example embodiment a predetermined amount of powder which may comprise moisture is moved from said first powder container 640 to said second container. Said predetermined amount of powder is distributed evenly over the movable table 152 in said second powder container 650. A heating source is heating said powder in said second powder container to a predetermined temperature interval. Said powder in said second powder container 650 is moved to said third powder container 610 before another predetermined amount of powder is provided to said second powder container 650 from said first powder container 640. This means that in this embodiment no powder drying is taking place in said first powder container 640. Only a small amount of powder may dried in said second powder container 650. When said powder has been dried in said second powder container 650 it is moved to said third powder container 610 for building said three-dimensional article. Said three dimensional-article may be built while another predetermined amount of powder is dried in said second powder container. The drying process and building process may be performed by the same heating source or separate heating sources.

Figure 7:
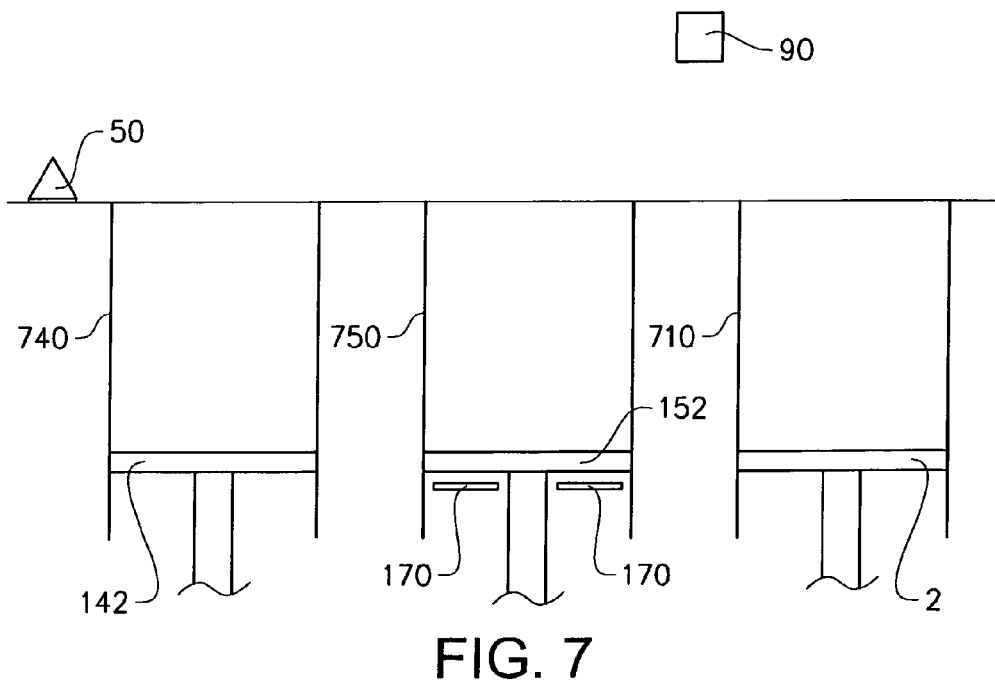
FIG. 7 depicts, in a schematic view, a fourth embodiment of a device according to the present invention for removing moisture inside an apparatus for producing a three dimensional product.

FIG. 7 illustrates yet another example embodiment of the present invention. As in FIG. 6 there are three powder containers, a first powder container 740, a second powder container 750 and a third powder container 710. A predetermined amount of powder which may comprise moisture may provided in said first powder container 740. A predetermined amount of powder is raked by said rake 50 from said first powder container 740 to said second powder container 750 by first raising the movable table 142 in said first powder container 740 a predetermined amount allowing a predetermined amount of powder to be raked off said first powder container. Said predetermined amount of powder in said second powder container is heated from below of its movable table 152 by means of a heating device 170 which may be resistive, IR or any other suitable heating source.

When said predetermined amount of powder has been elevated to a predetermined temperature it is raked from said second powder container 750 to said third powder container 710. The three dimensional article is manufactured in said third powder container 710. The heating of a predetermined amount of powder in said second powder container 750 may be performed simultaneously as the three-dimensional article is manufacture din said third powder container 710.

In still another example embodiment said heating device 90 which may be used for manufacturing said three-dimensional article in said third powder container 710 may assist the heating of said powder in said second powder container, i.e., there is a dual heating in said second powder container, a first heating source 170 form below said movable table 152 and a second heating source which is heating the top surface of the powder layer. Instead of using the heating device which is aimed for the manufacturing of the three-dimensional article, still another supplementary heating device may be used for heating the top layer of the powder. The supplementary heating source may be a laser source, e-beam source, IR-source or a resistive source.

In still another example embodiment a complete amount of powder which is necessary for building a predetermined three-dimensional article is dried layer by layer in said second powder container before the manufacturing of said three-dimensional article is started.

The invention is not limited to the above-described embodiments and many modifications are possible within the scope of the following claims. Such modifications may, for example, involve using a different source of energy beam than the exemplified electron beam such as a laser beam. Other materials than metallic powder may be used such as powder of polymers or powder of ceramics.

The invention claimed is:

1. A method for removing moisture from powder to be used in an additive manufacturing process for forming a three-dimensional article through successive fusion of parts of at least one layer of a powder bed provided on a work table located within a build tank, which parts corresponds to successive cross sections of the three-dimensional article, said method comprising the steps of:
    providing at least a first powder tank and at least a second powder tank, providing a predetermined amount of powder on a movable table inside said first powder tank,
    heating the top surface of the powder in said first powder tank to a predetermined temperature for removing moisture from said powder,
    raising said movable table a predetermined distance,
    moving a predetermined thickness of the powder material from said first powder tank to said second powder tank, wherein said first powder tank is said build tank for building said three dimensional article,
    continuing said heating and moving of dried powder from the build tank to the second powder tank until the predetermined amount of powder is moved from the build tank to the second powder tank.

2. The method according to claim 1, wherein said movable table is said work table.

3. The method according to claim 1, further comprising the step of providing said first and second powder tank inside an enclosable chamber.

4. The method according to claim 3, wherein said enclosable chamber is a vacuum chamber.

5. The method according to claim 1, wherein said predetermined temperature is less than a reaction temperature in which the moisture is starting to react with the powder material.

6. The method according to claim 1, wherein said temperature is less than a sintering temperature in which powder particles in said powder is starting to sinter together.

7. The method according to claim 1, further comprising the step of providing a supplementary heating device for heating the top surface of the powder material from above.

8. The method according to claim 1, wherein the fusing of the powder material and heating of the top surface of the powder material for removing moisture are performed by a shared high energy beam source.

9. The method according to claim 8, wherein said supplementary heating device is at least one of a laser or an infrared source.

10. The method according to claim 8, wherein said high energy beam source is an electron beam.

11. The method according to claim 4, further comprising the step of starting said heating of said top surface of said powder material as soon as vacuum conditions in said vacuum chamber are established.

* * * * *